United States Patent
Gormally et al.

(10) Patent No.: US 11,475,332 B2
(45) Date of Patent: Oct. 18, 2022

(54) SELECTING FORECASTING MODELS BY MACHINE LEARNING BASED ON ANALYSIS OF MODEL ROBUSTNESS

(71) Applicant: International Business Machines Corporation, Armonk, NY (US)

(72) Inventors: Robert Gormally, Galway (IE); Bradley Eck, Dublin (IE); Francesco Fusco, Maynooth (IE); Mark Purcell, Naas (IE); Seshu Tirupathi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 16/926,740

(22) Filed: Jul. 12, 2020

(65) Prior Publication Data
US 2022/0012609 A1    Jan. 13, 2022

(51) Int. Cl.
*G06N 20/00*    (2019.01)
*G06N 5/04*    (2006.01)

(52) U.S. Cl.
CPC ............ *G06N 5/04* (2013.01); *G06N 20/00* (2019.01)

(58) Field of Classification Search
CPC ........ G06N 5/04; G06N 20/00; G06N 3/0445; G06N 3/088; G06N 7/005; G06N 7/00;
(Continued)

(56) References Cited

U.S. PATENT DOCUMENTS 6,523,015 B1    2/2003  Bera
7,610,214 B1    10/2009  Dwarakanath
(Continued)

FOREIGN PATENT DOCUMENTS

CN    108875842 A    11/2018

OTHER PUBLICATIONS

Khemane, et al., "Robust estimation of fractional models in the frequency domain using set membership methods", Signal Processing, 92 (2012) pp. 1591-1601, <https://www.sciencedirect.com/science/article/pii/S0165168411004415?via%3Dihub>.
(Continued)

*Primary Examiner* — Le H Luu
(74) *Attorney, Agent, or Firm* — Edward P. Li

(57) ABSTRACT

A computer-implemented method, a computer program product, and a computer system for selecting predictions by models. A computer receives a request for a forecast of a dependent variable in a time domain, where the time domain includes first time periods that have normal labels due to normal predictor variable data and second time periods that have anomalous labels due to anomalous predictor variable data. The computer retrieves accuracy scores and robustness scores of models, where the accuracy scores indicate forecasting accuracy in the first time periods and the robustness scores indicate forecasting accuracy in the second time periods. For predictions in the first time period, the computer selects dependent variable values predicted by a first model that has highest values of the accuracy scores. For predictions in the second time periods, the computer selects dependent variable values predicted by a second model that has highest values of the robustness scores.

18 Claims, 13 Drawing Sheets

(58) Field of Classification Search
CPC .. G06Q 10/04; G06Q 30/0185; G05B 23/024; G06F 17/18
See application file for complete search history.

(56) References Cited

U.S. PATENT DOCUMENTS

| | | | |
|---|---|---|---|
| 8,099,442 | B2 | 1/2012 | Xiao |
| 8,170,841 | B2 | 5/2012 | Pinto |
| 10,338,994 | B1 | 7/2019 | Xie |
| 2005/0102175 | A1 | 5/2005 | Dudat |
| 2016/0132775 | A1 | 5/2016 | Baughman |
| 2016/0299938 | A1* | 10/2016 | Malhotra ............. G06N 3/0445 |
| 2017/0124079 | A1* | 5/2017 | Drennan, III .......... G06N 20/00 |
| 2018/0075360 | A1 | 3/2018 | Tanimoto |
| 2018/0095004 | A1* | 4/2018 | Ide ......................... G06N 7/005 |
| 2018/0356807 | A1 | 12/2018 | Honda |
| 2019/0042887 | A1 | 2/2019 | Nguyen |
| 2020/0210393 | A1* | 7/2020 | Beaver .................... G06F 17/18 |
| 2020/0285997 | A1* | 9/2020 | Bhattacharyya ......... G06N 7/00 |
| 2020/0334228 | A1* | 10/2020 | Matyska ............ G06Q 30/0185 |
| 2020/0379454 | A1* | 12/2020 | Trinh ..................... G06N 3/088 |
| 2021/0334656 | A1* | 10/2021 | Sjögren ................ G05B 23/024 |

OTHER PUBLICATIONS

Mell et al., "The NIST Definition of Cloud Computing", National Institute of Standards and Technology, Special Publication 800-145, Sep. 2011, 7 pages.

\* cited by examiner

SELECTING FORECASTING MODELS BY MACHINE LEARNING BASED ON ANALYSIS OF MODEL ROBUSTNESS

BACKGROUND

The present invention relates generally to machine learning in forecasting models, and more particularly to selecting predictions made by forecasting models based on analysis of robustness of the forecasting models.

Increasing adoption of artificial intelligence (AI) and machine learning (ML) across a broad spectrum of industries has led to an increasing number of AI and ML forecasting models being deployed. For example, the AI and ML forecasting models in real-world applications include the forecasting of household, business, or industry energy consumption by electrical grid operators to balance supply and demand, forecasting of consumer demand for products by retailers in order to optimize logistics chains, and the forecasting of aircraft component failure by airlines enabling pre-emptive maintenance and thereby reducing costly delays.

Irrespective of the industry, a common characteristic of such forecasting models is that the accuracy of predictions provided by the forecasting models have direct or indirect impacts on business outcomes—higher accuracy means better business.

Another common characteristic of such forecasting models is that the forecasting models irregularly encounter anomalous predictor variable data while generating forecasts. For example, an IoT sensor may have lost power and consequently may not measure observation values for a period of time. In another example, the forecasting models may not be able to retrieve a subset of data required by forecasting models from a remote endpoint due to a transient network connectivity issue.

SUMMARY

In one aspect, a computer-implemented method for selecting predictions made by models with normal and anomalous predictor variable data is provided. The computer-implemented method includes receiving a request for a forecast of a dependent variable in a time domain, where the time domain includes first respective time periods that have normal labels due to normal predictor variable data and second respective time periods that have anomalous labels due to anomalous predictor variable data. The computer-implemented method further includes retrieving accuracy scores and robustness scores of models, where the accuracy scores indicate forecasting accuracy in the first respective time periods and the robustness scores indicate forecasting accuracy in the second respective time periods. The computer-implemented method further includes selecting dependent variable values predicted by a first model that has highest values of the accuracy scores, for predictions in the first respective time periods. The computer-implemented method further includes selecting dependent variable values predicted by a second model that has highest values of the robustness scores, for predictions in the second respective time periods.

In another aspect, a computer program product for selecting predictions made by models with normal and anomalous predictor variable data is provided. The computer program product comprises a computer readable storage medium having program instructions embodied therewith, and the program instructions are executable by one or more processors. The program instructions are executable to receive a request for a forecast of a dependent variable in a time domain, where the time domain includes first respective time periods that have normal labels due to normal predictor variable data and second respective time periods that have anomalous labels due to anomalous predictor variable data; retrieve accuracy scores and robustness scores of models, where the accuracy scores indicate forecasting accuracy in the first respective time periods and the robustness scores indicate forecasting accuracy in the second respective time periods; select dependent variable values predicted by a first model that has highest values of the accuracy scores, for in the first respective time periods; and select dependent variable values predicted by a second model that has highest values of the robustness scores, for predictions in the second respective time periods.

In yet another aspect, a computer system for selecting predictions made by models with normal and anomalous predictor variable data is provided. The computer system comprises one or more processors, one or more computer readable tangible storage devices, and program instructions stored on at least one of the one or more computer readable tangible storage devices for execution by at least one of the one or more processors. The program instructions are executable to receive a request for a forecast of a dependent variable in a time domain, where the time domain includes first respective time periods that have normal labels due to normal predictor variable data and second respective time periods that have anomalous labels due to anomalous predictor variable data. The program instructions are further executable to retrieve accuracy scores and robustness scores of models, where the accuracy scores indicate forecasting accuracy in the first respective time periods and the robustness scores indicate forecasting accuracy in the second respective time periods. The program instructions are further executable to select dependent variable values predicted by a first model that has highest values of the accuracy scores, for predictions in the first respective time periods. The program instructions are further executable to select dependent variable values predicted by a second model that has highest values of the robustness scores, for predictions in the second respective time periods.

DETAILED DESCRIPTION

In order to predict a time series variable of a business value, multiple forecasting models are deployed on a forecasting platform, and the forecasting platform continuously evaluates and compares the accuracy of the forecasting models using a defined metric. An example of such a metric is mean absolute percentage error (MAPE) that measures the average percentage difference between observed values and predicted values of a variable being forecast (or dependent variable). When a forecast is needed, the forecasting platform selects a model that currently exhibits the highest accuracy and provides its predictions to downstream business processes or users.

It is a conventional idea that, where model input data (or predictor variable data) is anomalous for a forecasting period, the forecasting platform should continue to select a model that currently exhibits the highest accuracy and use it to provide predictions. This conventional idea assumes that model accuracy and model robustness (the ability of a model to maintain accuracy in spite of anomalous input data) are correlated. However, this assumption may not always be the case, and more accurate models tend to be more susceptible to degradation in performance where there is anomalous predictor variable data; overall accuracy and robustness of a forecasting model often exhibit an inverse correlation.

Furthermore, accuracy metrics do not effectively encapsulate the impact of model robustness on prediction quality. Events of anomalous predictor variable data are comparatively infrequent and irregular, while accuracy metrics are typically generated over a moving window of multiple consecutive forecasting periods; thus, the impact of events of anomalous predictor variable data on overall model accuracy scores is dampened.

Figure 1:
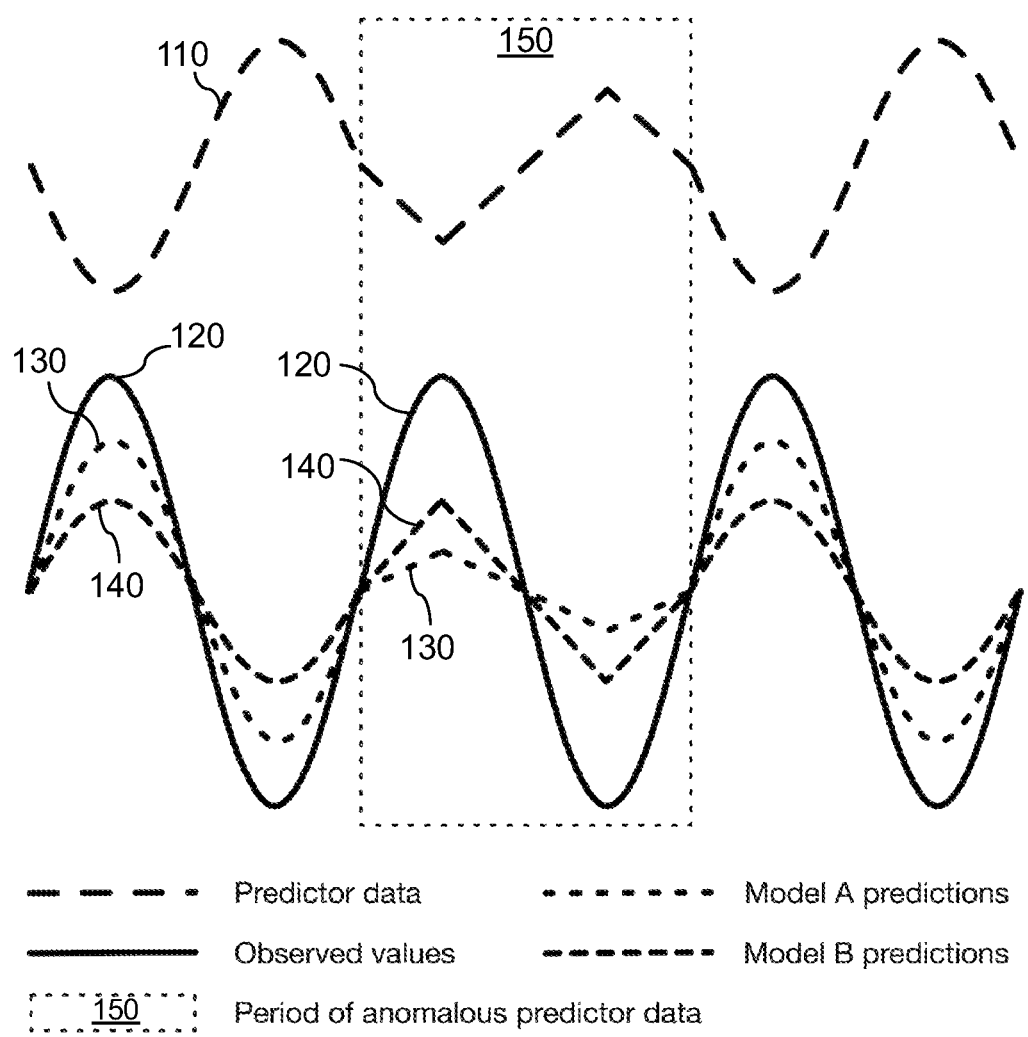
FIG. 1 illustrates forecasting models irregularly encounter anomalous predictor variable data while generating forecasts.

As shown in FIG. 1, predictor variable data 110 is anomalous in time period 150. FIG. 1 shows observed values 120 of the variable being forecast (or dependent variable). FIG. 1 also shows predicted values of the variable being forecast (or dependent variable) by two different forecasting models: predicted values 130 by forecasting model A and predicted values 140 by forecasting model B. Forecasting model A exhibits lower overall error compared to forecasting model B. For example, overall MAPE of forecasting model A is 5.0%, while overall MAPE of forecasting model B is 7.5%. However, forecasting model A is less robust than forecasting model B in time period 150 (where anomalous predictor variable data occurs). For example, MAPE of forecasting model A in time period 150 is 20.0%, while MAPE of forecasting model B in time period 150 is 15.0%.

State of the art forecasting platforms will naively select forecasting model A as it exhibits lower overall error and will use forecasting model A to provide predictions during time periods where a subset of the predictor variable data is anomalous. However, for predictions in those anomalous periods, forecasting model B exhibits lower error.

Embodiments of the present invention disclose a system and method for estimating the robustness of a set of forecasting models deployed to forecast a dependent variable and further selecting the predictions from forecasting models that most likely exhibit the highest accuracy and/or robustness.

A forecasting platform includes a set of forecasting models. The forecasting models use data of a predictor variable and characteristics of a predictor variable to forecast a dependent variable. The forecasting platform is implemented on one or more computing devices or servers. A computing device or server is described in more detail in later paragraphs with reference to FIG. 9. In another embodiment, the operational steps may be implemented on a virtual machine or another virtualization implementation being run on one or more computing devices or servers. In yet another embodiment, the operational steps may be implemented in a cloud computing environment. The cloud computing environment is described in later paragraphs with reference to FIG. 10 and FIG. 11.

Figure 2:
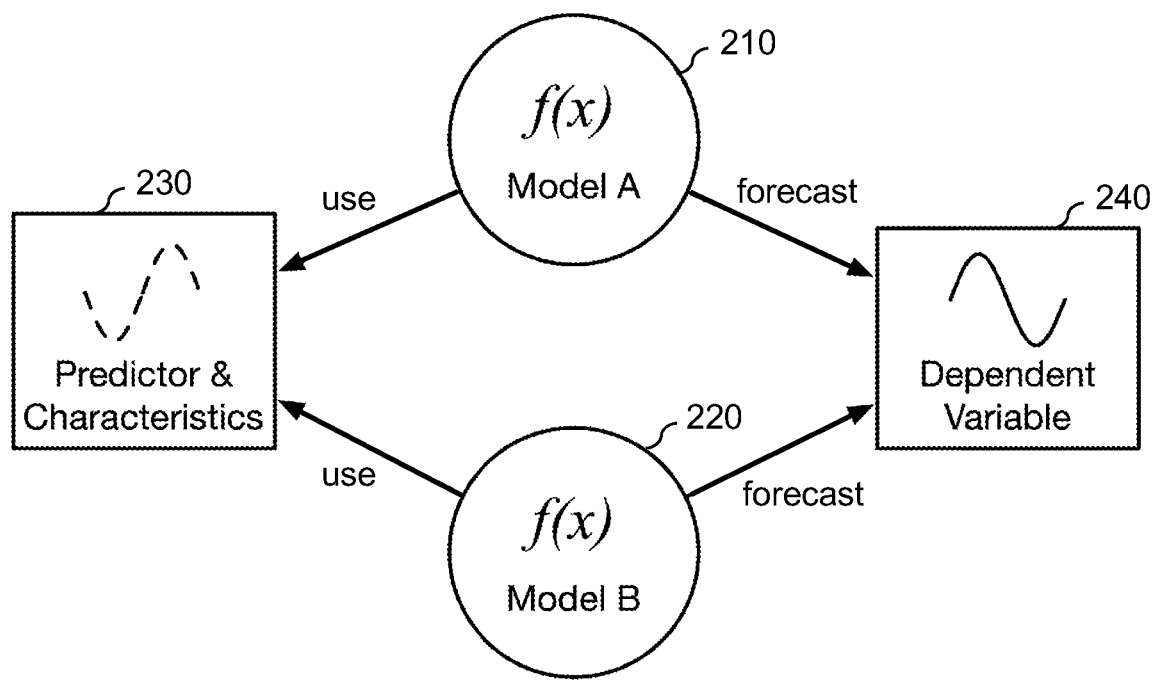
FIG. 2 is a diagram illustrating a forecasting platform, in accordance with one embodiment of the present invention.

FIG. 2 is a diagram illustrating a forecasting platform, in accordance with one embodiment of the present invention. As an example, the forecasting platform includes two forecasting models: model A 210 and model B 220. Model A 210 and model B 220 use the predictor variable and its characteristics 230 to forecast dependent variable 240.

An exemplary use case is considered, in which the forecasting platform is used in a renewable energy domain. A prosumer's net electrical energy is forecast by a grid operator using the forecasting platform. The prosumer has solar photovoltaic panels installed. The grid operator deploys forecasting models on the forecasting platform to forecast the prosumer's net electrical energy consumption and production over a time period. The variable to be forecast or dependent variable is the net electrical energy consumption and production. The predictor variable is forecasted solar irradiance; the forecasting models use forecasted solar irradiance data sourced from an external provider as the predictor variable data. One or more characteristics of the predictor variable are defined and stored on the forecasting platform; for example, in this use case, a single characteristic of the predictor variable is defined: forecasted solar irradiance value ranges should be curvilinear instead of linear. In other embodiments, multiple characteristics for the predictor variable may be defined.

Figure 3:
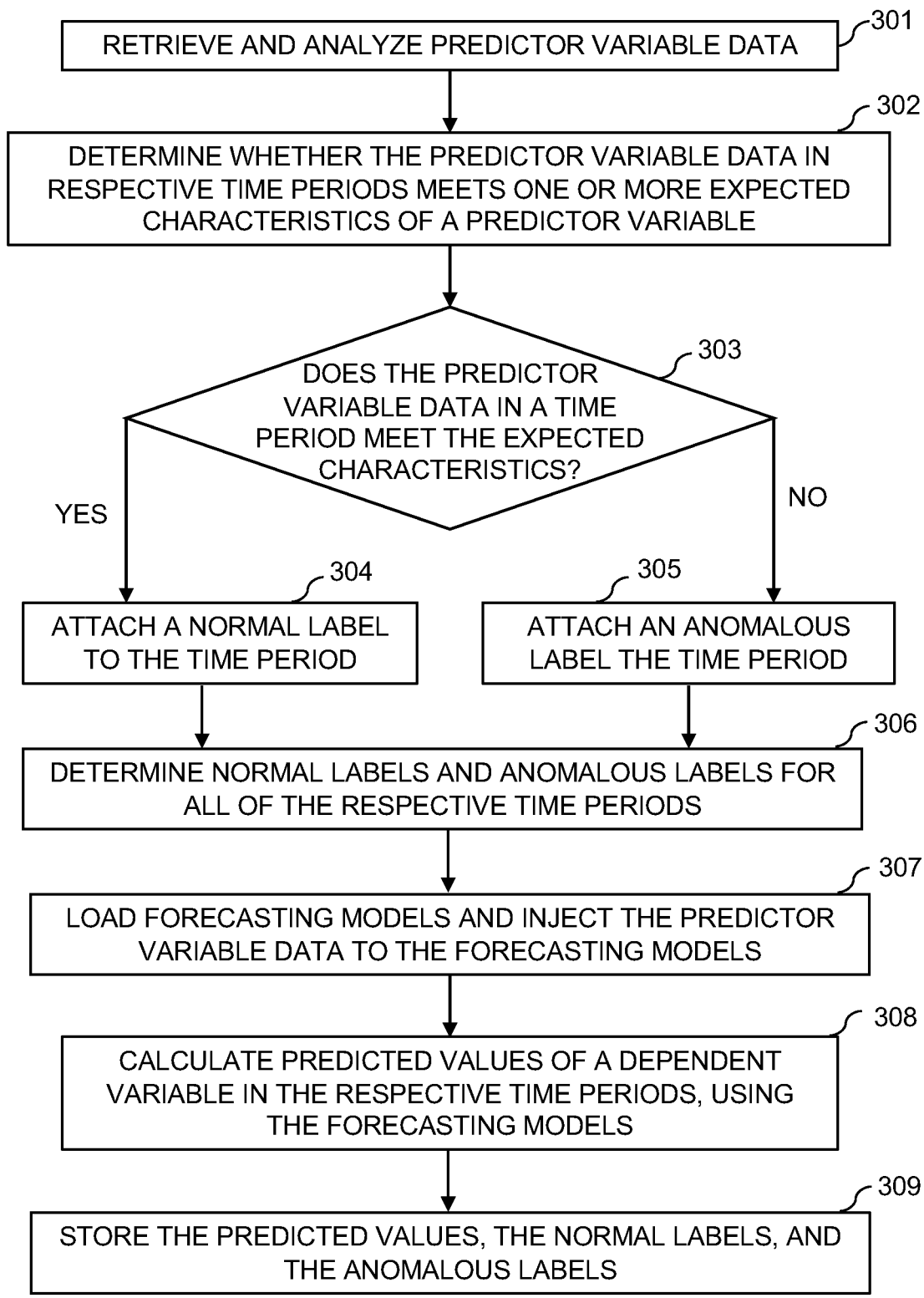
FIG. 3 presents a flowchart showing operational steps of detection of normal and anomalous predictor variable data, in accordance with one embodiment of the present invention.

FIG. 3 presents a flowchart showing operational steps of detection of normal and anomalous predictor variable data, in accordance with one embodiment of the present invention. The operational steps are implemented by a forecasting platform shown in FIG. 2.

At step 301, the forecasting platform retrieves predictor variable data and analyzes the data. In the use case mentioned above, for example, the forecasting platform retrieves latest solar irradiance data from an external weather data provider, and the forecasting platform analyzes the retrieved solar irradiance data.

At step 302, the forecasting platform determines whether the predictor variable data in respective time periods meets one or more expected characteristics of a predictor variable. In the use case mentioned above, for example, the predictor variable is forecasted solar irradiance and a single characteristic of the predictor variable is curvilinear. The forecasting platform determines whether forecasted solar irradiance data is curvilinear instead of linear.

The forecasting platform checks the predictor variable data in each of the respective time periods. In response to determining that the predictor variables data in a time period meets the one or more expected characteristics (YES branch of decision block 303), at step 304, the forecasting platform attaches a normal label to the time period. In response to determining that the predictor variables data in a time period does not meet the one or more expected characteristics (NO branch of decision block 303), at step 305, the forecasting platform attaches an anomalous label to the time period. In the example of the use case mentioned previously, in response to determining that solar irradiance data is curvilinear instead of linear, the forecasting platform labels the time period as normal; in response to determining that solar irradiance data is not curvilinear, the forecasting platform labels the time period as anomalous.

In such a way shown in the last paragraph, the forecasting platform, at step 306, determines normal labels and anomalous labels for all of the respective time periods. At step 307, the forecasting platform loads forecasting models and injects the predictor variable data to the forecasting models. In the example of the use case mentioned previously, the forecasting platform injects solar irradiance data to the forecasting models.

At step 308, the forecasting platform, by using the forecasting models, calculates predicted values of a dependent variable in the respective time periods. In the example of the use case mentioned previously, the forecasting platform computes a net electric energy consumption and production forecast for the prosumer. At step 309, the forecasting platform stores the predicted values (calculated at step 308) and stores the normal labels and the anomalous labels (determined at step 306).

Figure 4A:
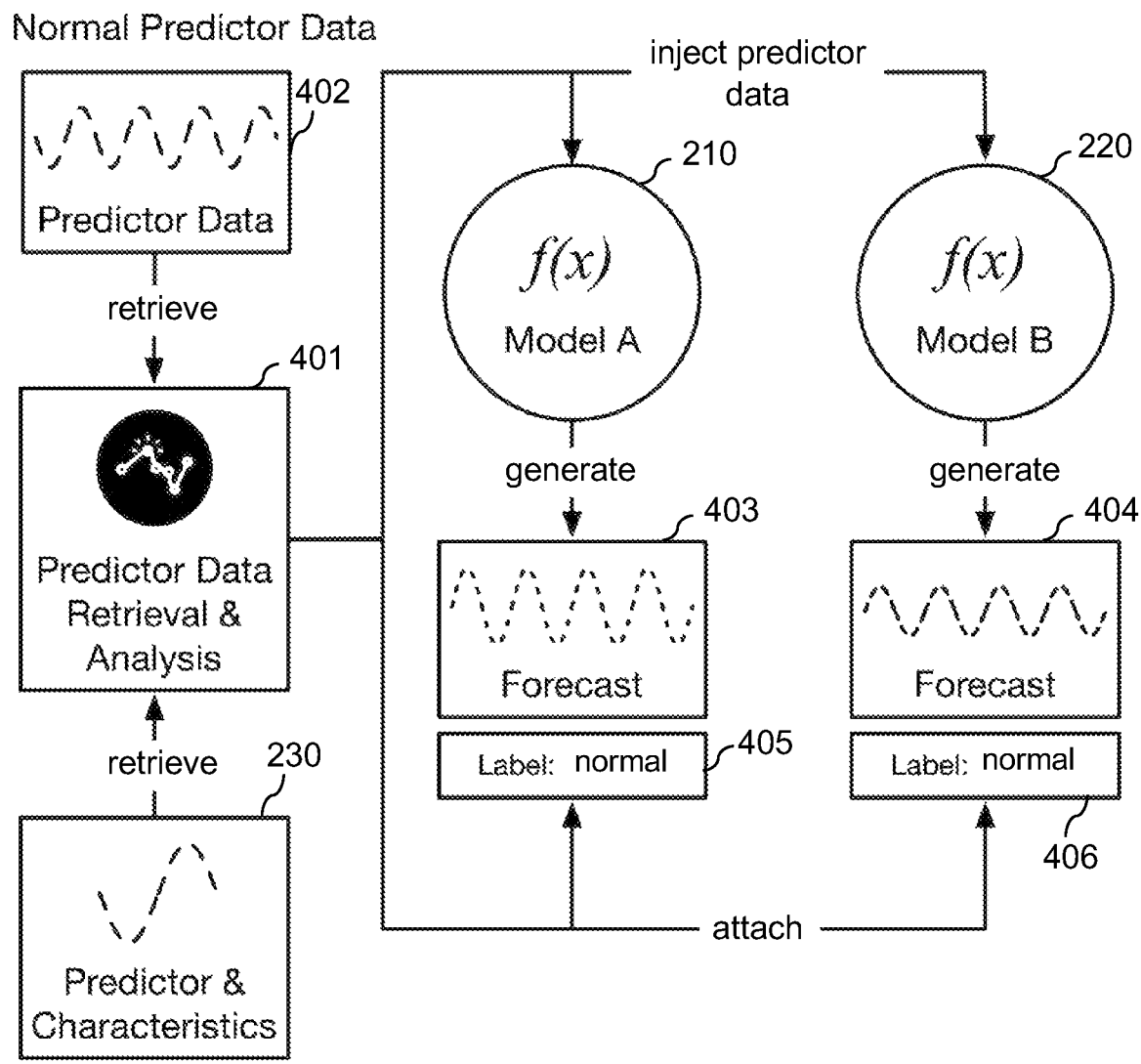
FIG. 4(A) is a diagram illustrating detection of normal predictor variable data, in accordance with one embodiment of the present invention.

FIG. 4(A) is a diagram illustrating detection of normal predictor variable data, in accordance with one embodiment of the present invention. Predictor variable data retrieval and analysis module 401 of the forecasting platform retrieves normal predictor variable data 402 and retrieves the predictor variable and its characteristics 230. In the example of the use case mentioned previously, the normal predictor variable data 402 is curvilinear instead of linear. The forecasting platform injects the normal predictor variable data to two forecasting modes including model A 210 and model B 220. Model A 210 generates forecast 403 (by calculating predicted values of the dependent variable based on the normal predictor variable data) and attaches normal label 405 to the time period with normal predictor variable data. Model B 220 generates forecast 404 (by calculating predicted values of the dependent variable based on the normal predictor variable data) and attaches normal label 406 to the time period with the normal predictor variable data.

Figure 4B:
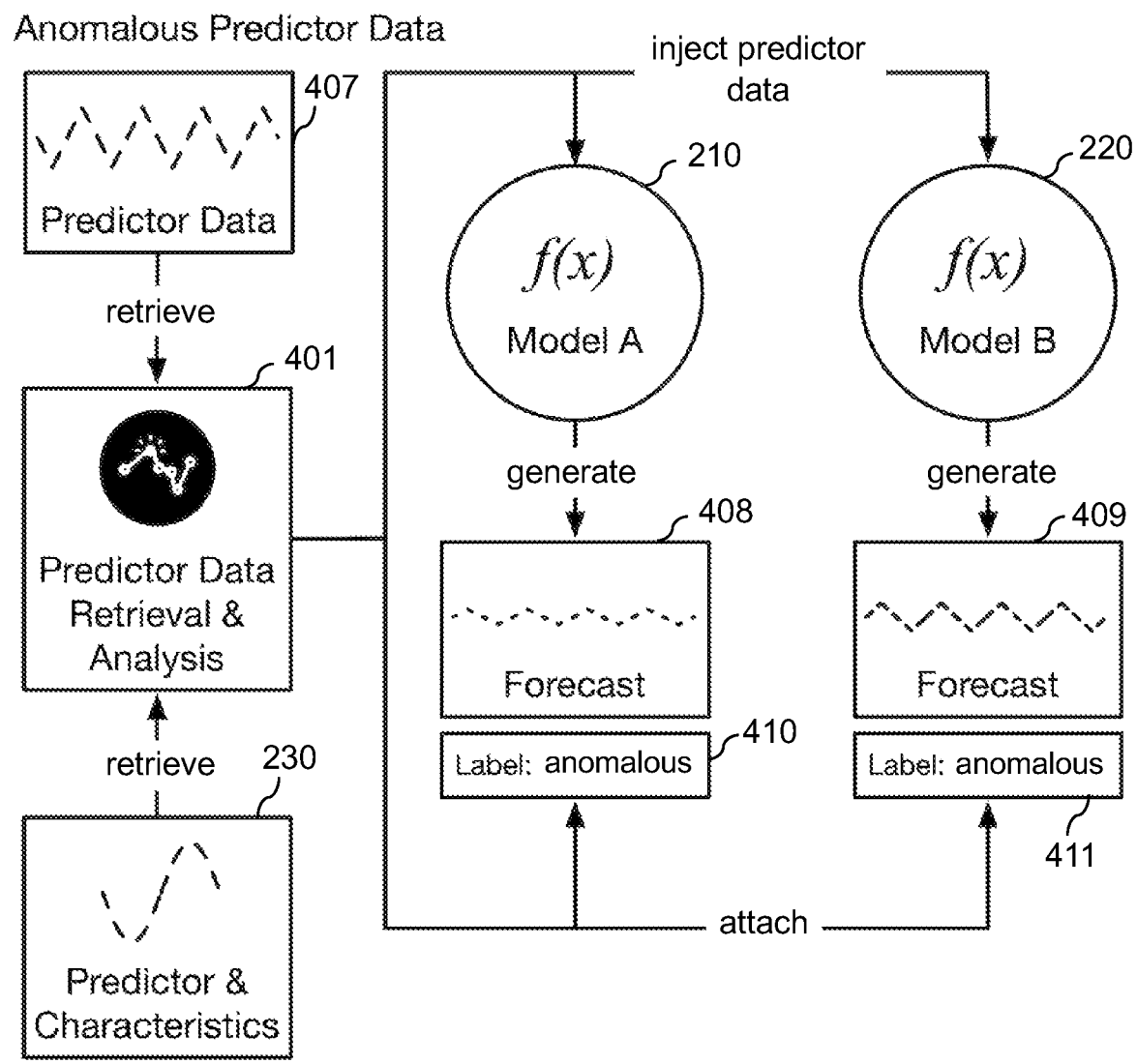
FIG. 4(B) is a diagram illustrating detection of anomalous predictor variable data, in accordance with one embodiment of the present invention.

FIG. 4(B) is a diagram illustrating detection of anomalous predictor variable data, in accordance with one embodiment of the present invention. Predictor variable data retrieval and analysis module 401 of the forecasting platform retrieves anomalous predictor variable data 407 and retrieves the predictor variable and its characteristics 230. In the example of the use case mentioned previously, anomalous predictor variable data 407 is not curvilinear. The forecasting platform injects the anomalous predictor variable data to two forecasting modes including model A 210 and model B 220. Model A 210 generates forecast 408 (by calculating predicted values of the dependent variable based on the anomalous predictor variable data) and attaches anomalous label 410 to the time period with the anomalous predictor variable data. Model B 220 generates forecast 409 (by calculating predicted values of the dependent variable based on the anomalous predictor variable data) and attaches anomalous label 411 to the time period with the anomalous predictor variable data.

Figure 5:
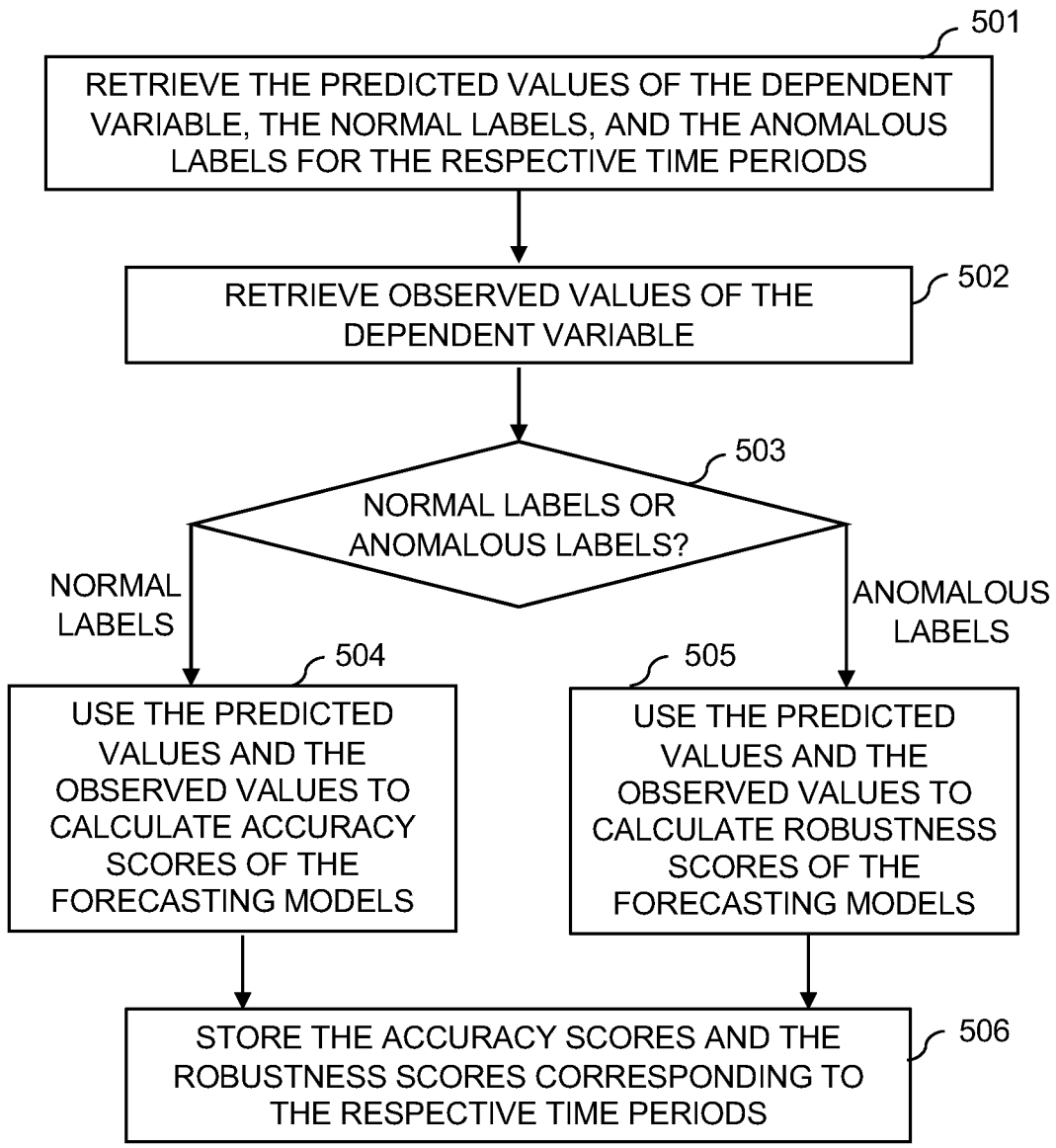
FIG. 5 presents a flowchart showing operational steps of determining accuracy scores and robustness scores, in accordance with one embodiment of the present invention.

FIG. 5 presents a flowchart showing operational steps of determining accuracy scores and robustness scores, in accordance with one embodiment of the present invention. The operational steps are implemented by a forecasting platform shown in FIG. 2.

At step 501, the forecasting platform retrieves the predicted values of the dependent variable, the normal labels, and the anomalous labels for the respective time periods. The predicted values of the dependent variable are calculated at step 308 and stored at step 309 shown in FIG. 3. The normal labels and the anomalous labels are determined at step 306 and stored at step 309 shown in FIG. 3.

At step 502, the forecasting platform retrieves observed values of the dependent variable. In the example of the use case mentioned previously, the observed values of the dependent variable are values of the net energy consumption and production, and they may stored on the forecasting platform.

At step 503, the forecasting platform determines whether the normal labels or the anomalous labels are determined for the respective time periods. In response to the normal labels, the forecasting platform at step 504 uses the predicted values and the observed values to calculate accuracy scores of the forecasting models. In response to the anomalous labels, the forecasting platform at step 505 uses the predicted values and the observed values to calculate robustness scores of the forecasting models. The accuracy scores indicate forecasting accuracy in the time periods with the normal labels, while the robustness scores indicate forecasting accuracy in the time periods with the anomalous labels. At step 506, the forecasting platform stores the accuracy scores and the robustness scores corresponding to the respective time periods.

Figure 6:
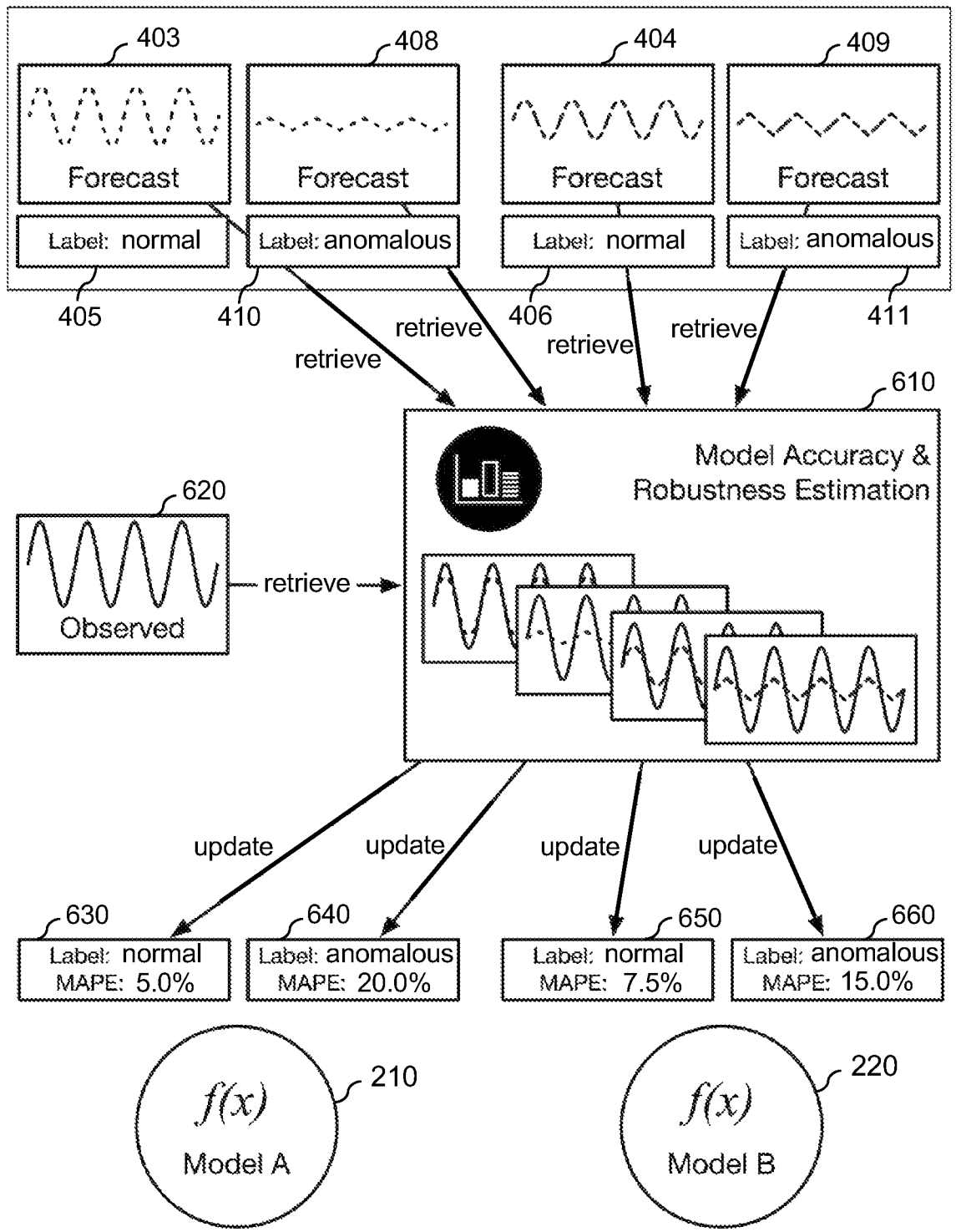
FIG. 6 is a diagram providing an illustration of determining accuracy scores and robustness scores, in accordance with one embodiment of the present invention.

FIG. 6 is a diagram providing an illustration of determining accuracy scores and robustness scores, in accordance with one embodiment of the present invention. Model accuracy and robustness estimation module 610 of the forecasting platform retrieves forecast 403, forecast 404, normal label 405, and normal label 406. Generating forecast 403, forecast 404, normal label 405, and normal label 406 are shown in FIG. 4(A). Model accuracy and robustness estimation module 610 retrieves forecast 408, forecast 409, anomalous label 410, and anomalous label 411. Generating forecast 408, forecast 409, anomalous label 410, and anomalous label 411 are shown in FIG. 4(B). Model accuracy and robustness estimation module 610 retrieves observed values 620 of the dependent variable. In the use case mentioned previously, observed values 620 of the dependent variable are observed values of the net electric energy consumption and production.

As an example, model accuracy and robustness estimation module 610 calculates the mean absolute percentage error (MAPE) as an accuracy score or a robustness score. Note that MAPE is just one type of forecasting accuracy metric; other accuracy metrics may be used. Based on observed values 620 and forecast 403, model accuracy and robustness estimation module 610 calculates MAPE and obtains the MAPE value of 5.0% (shown in block 630); this MAPE value is the accuracy score of model A 210 in the time period with the normal label. Based on observed values 620 and forecast 408, model accuracy and robustness estimation module 610 calculates MAPE and obtains the MAPE value of 20.0% (shown in block 640); this MAPE value is the robustness score of model A 210 in the time period with the anomalous label. Based on observed values 620 and forecast 404, model accuracy and robustness estimation module 610 calculates MAPE and obtains the MAPE value of 7.5% (shown in block 650); this MAPE value is the accuracy score of model B 220 in the time period with the normal label. Based on observed values 620 and forecast 409, model accuracy and robustness estimation module 610 calculates MAPE and obtains the MAPE value of 15.0% (shown in block 660); this MAPE value is the robustness score of model B 220 in the time period with the anomalous label.

Figure 7:
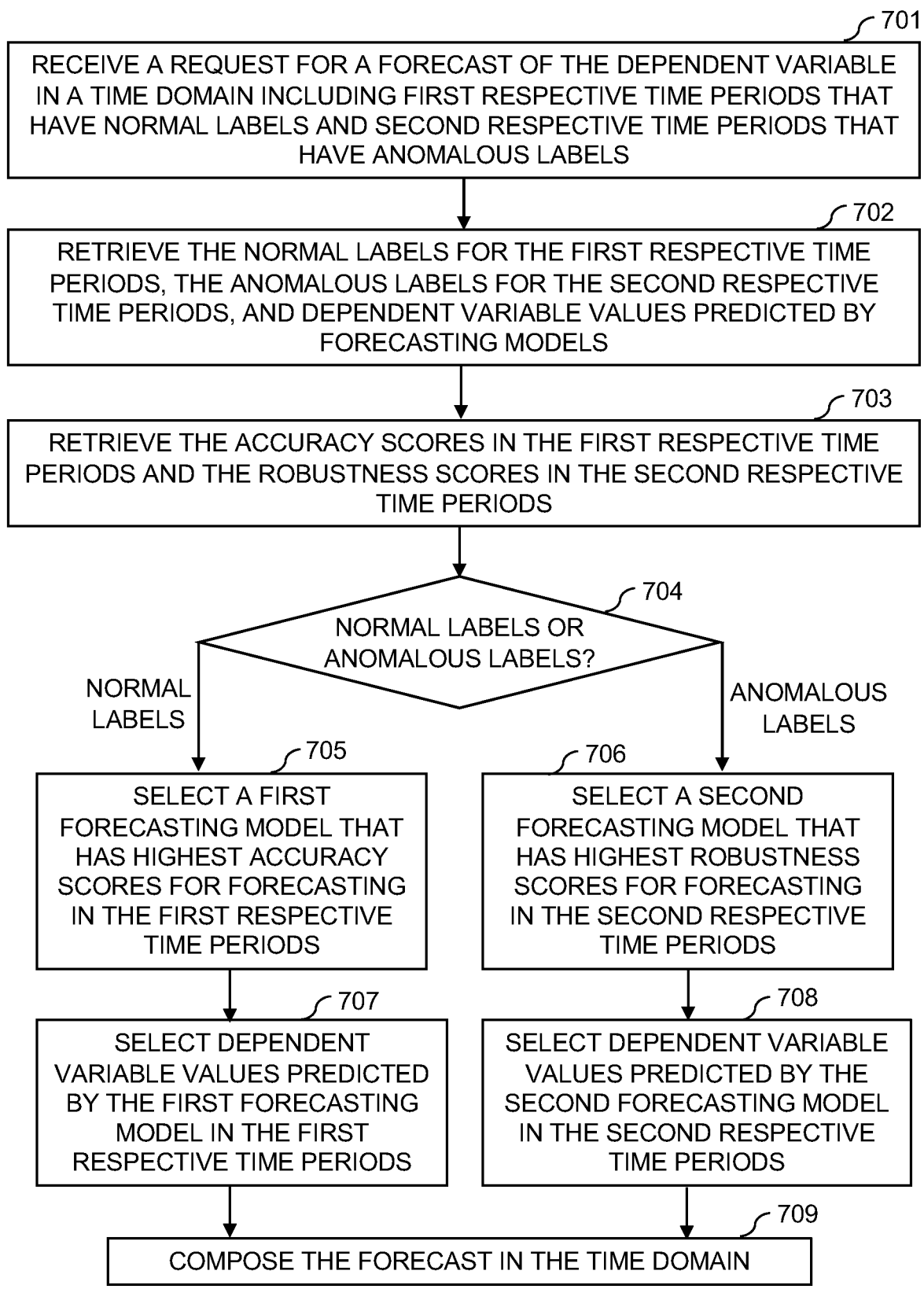
FIG. 7 presents a flowchart showing operational steps of selecting predictions made by forecasting models with normal and anomalous predictor variable data, in accordance with one embodiment of the present invention.

FIG. 7 presents a flowchart showing operational steps of selecting predictions made by forecasting models with normal and anomalous predictor variable data, in accordance with one embodiment of the present invention. The operational steps are implemented by a forecasting platform shown in FIG. 2.

At step 701, the forecasting platform receives a request for a forecast of the dependent variable in a time domain. The time domain includes first respective time periods that have the normal labels due to the normal predictor variable data and second respective time periods have the anomalous labels due to the anomalous predictor variable data. In the use case mentioned previously, the predictor variable data is the forecasted solar irradiance data, and the dependent variable is the net electric energy consumption and production. In the use case mentioned previously, normal forecasted solar irradiance data is curvilinear instead of linear in the first respective time periods, while anomalous forecasted solar irradiance data is linear in the second respective time periods.

At step 702, the forecasting platform retrieves the normal labels for the first time periods, the anomalous labels for the second respective time periods, and dependent variable values predicted by the forecasting models. The normal labels and the anomalous labels are determined at step 306 and stored at step 309 shown in FIG. 3. As an example, FIG. 4(A) shows normal label 405 and normal label 406, and FIG. 4(B) shows anomalous label 410 and anomalous label 411. The dependent variable values predicted by the forecasting model have been calculated at step 308 and stored at step 309.

At step 703, the forecasting platform retrieves the accuracy scores in the first time periods and the robustness scores in the second respective time periods. The accuracy scores and the robustness scores are calculated at steps 504 and 505 and stored at step 506 shown in FIG. 5. As an example, FIG. 6 shows MAPE values as the accuracy scores (blocks 630 and 650) and the robustness scores (blocks 640 and 660).

At step 704, the forecasting platform determines whether the normal labels or the anomalous labels are determined for the respective time periods. In response to the normal labels, at step 705, the forecasting platform selects, from the forecasting models, a first forecasting model that has highest accuracy scores for forecasting in the first respective time periods. At step 707, for predictions in the first time periods, the forecasting platform selects dependent variable values predicted by the first forecasting model in the first time periods. The dependent variable values predicted by the first forecasting model have been calculated at step 308 and stored at step 309.

In response to the anomalous labels, at step 706, the forecasting platform selects, from the forecasting models, a second forecasting model that has highest robustness scores for forecasting in the second respective time periods. At step 708, for predictions in the second time periods, the forecasting platform selects dependent variable values predicted by the second forecasting model in the second time periods. The dependent variable values predicted by the second forecasting model have been calculated at step 308 and stored at step 309.

At step 709, the forecasting platform composes the forecast of the dependent variable in the time domain. The forecasting platform uses the dependent variable values predicted by the first forecasting model in the first time period (which are labeled as normal and where the first forecasting model has the highest accuracy scores) and the dependent variable values predicted by the second forecasting model in the second time period (which are labeled as anomalous and where the second forecasting model has the highest robustness scores) to compose the forecast of the dependent variable in the whole time domain. Thus, the forecast of the dependent variable can be accurate in both normal time periods and anomalous time periods.

Figure 8A:
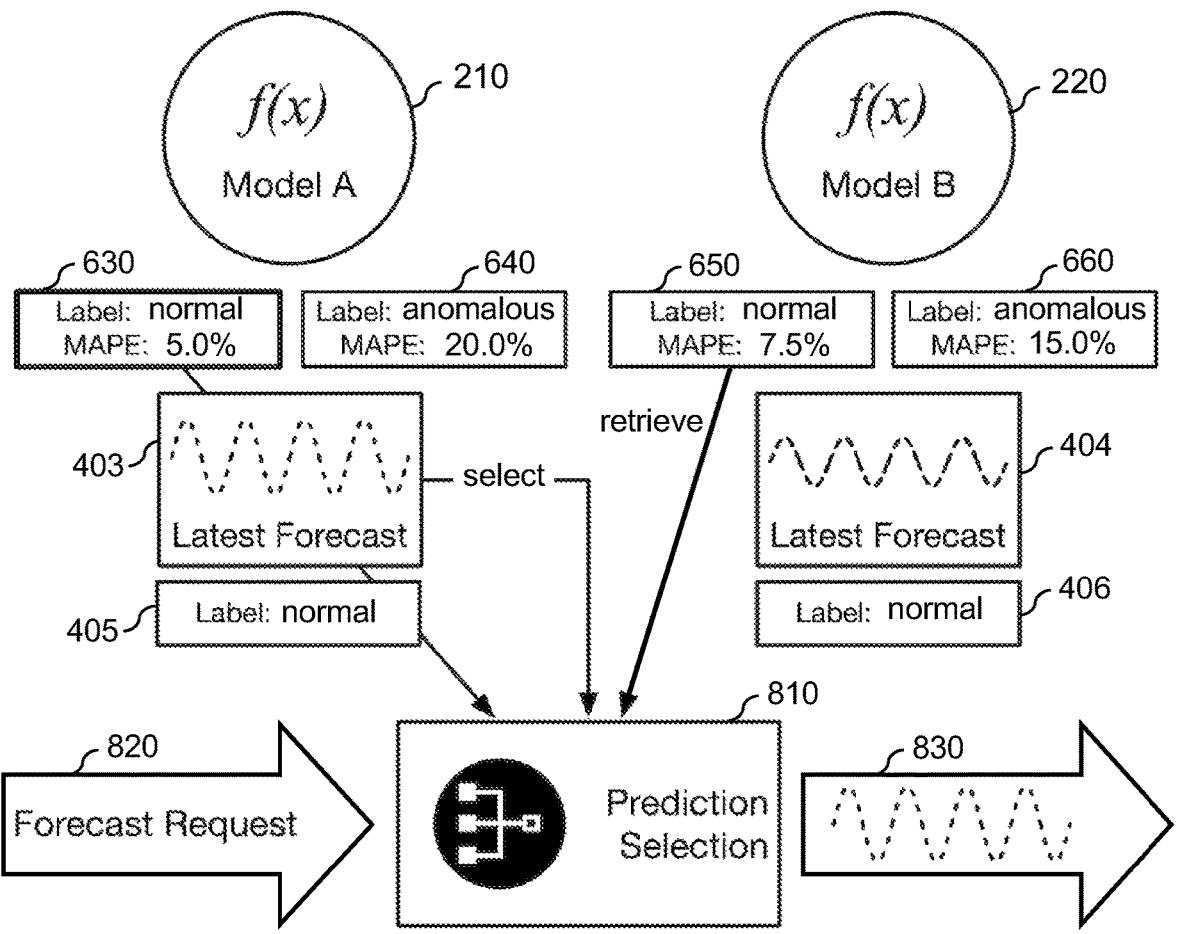
FIG. 8(A) is a diagram providing an illustration of selecting a prediction made by a forecasting model with normal predictor variable data, in accordance with one embodiment of the present invention.

FIG. 8(A) is a diagram providing an illustration of selecting a prediction made by a forecasting model with normal predictor variable data, in accordance with one embodiment of the present invention. In the example shown in FIG. 8(A), prediction selection module 810 of the forecasting platform retrieves normal label 405, forecast 403, normal label 406, and forecast 404. Generating forecast 403, forecast 404, normal label 405, and normal label 406 are shown in FIG. 4(A). Prediction selection module 810 retrieves the accuracy scores and the robustness scores. In the example shown in FIG. 8(A), prediction selection module 810 retrieves MAPE values (blocks 630 and 650) as the accuracy scores.

Prediction selection module 810 receives forecast request 820. For prediction 830 in time periods labeled as normal, prediction selection module 810 selects forecast 403 predicted by model A 210, because MAPE value (5.0% in block 630) of model A 210 is lower than the MAPE value (7.5% in block 650) of model B 220 in the time period labeled as normal.

Figure 8B:
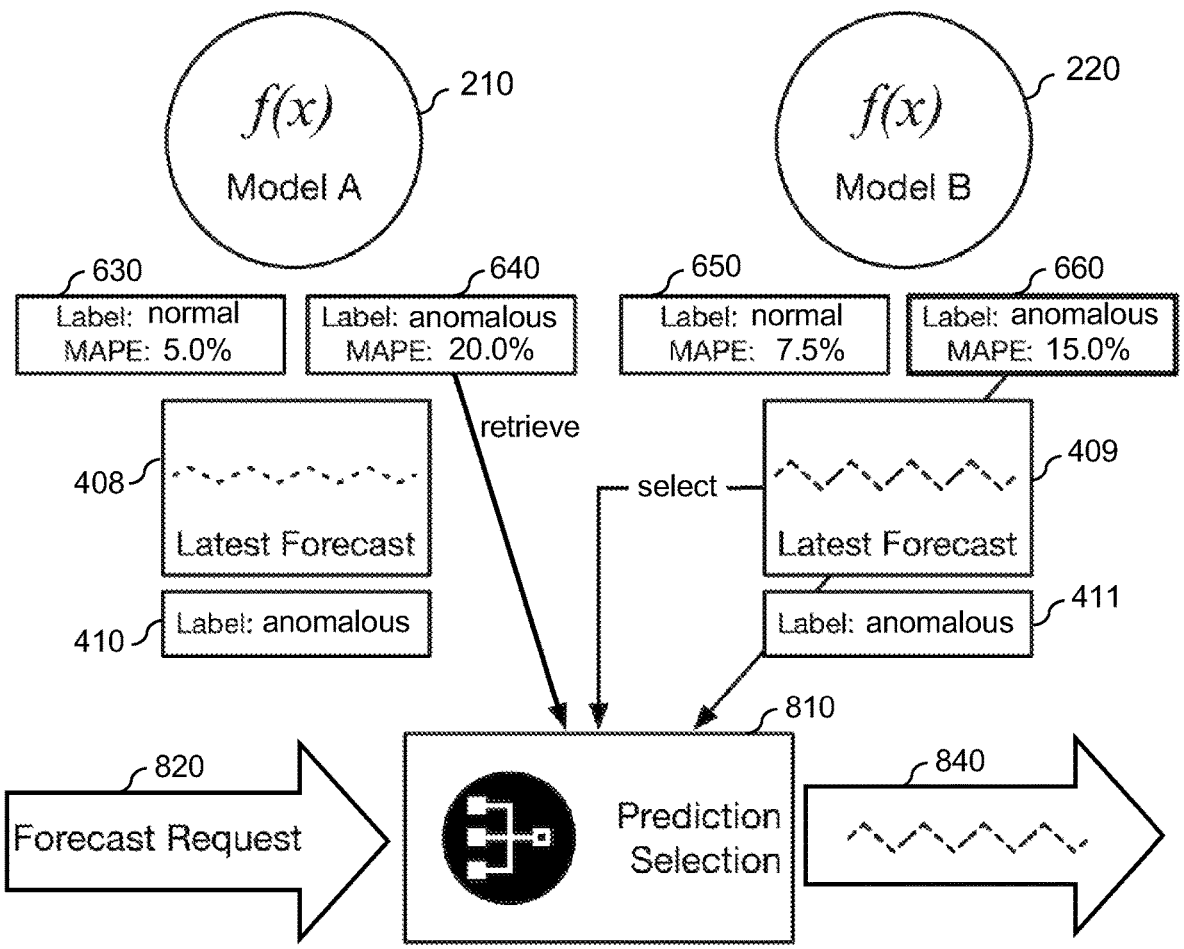
FIG. 8(B) is a diagram providing an illustration of selecting a prediction made by a forecasting model with anomalous predictor variable data, in accordance with one embodiment of the present invention.

FIG. 8(B) is a diagram providing an illustration of selecting a prediction made by a forecasting model with anomalous predictor variable data, in accordance with one embodiment of the present invention. In the example shown in FIG. 8(A), prediction selection module 810 of the forecasting platform retrieves anomalous label 410, forecast 408, anomalous label 411, and forecast 409. Generating forecast 408, forecast 409, anomalous label 410, and anomalous label 411 are shown in FIG. 4(B). Prediction selection module 810 retrieves MAPE values (blocks 640 and 660) as the robustness scores.

Prediction selection module 810 receives forecast request 820. For prediction 840 in time periods labeled as anomalous, prediction selection module 810 selects forecast 409 predicted by model B 220, because MAPE value (15.0% in block 660) of model B 220 is lower than the MAPE value (20.0% in block 640) of model A 210 in the time period labeled as anomalous.

Prediction selection module 810 uses prediction 830 (shown in FIG. 8(A)) and prediction 840 (shown in FIG. 8(B)) to compose a forecast of the dependent variable in the whole time domain.

Figure 9:
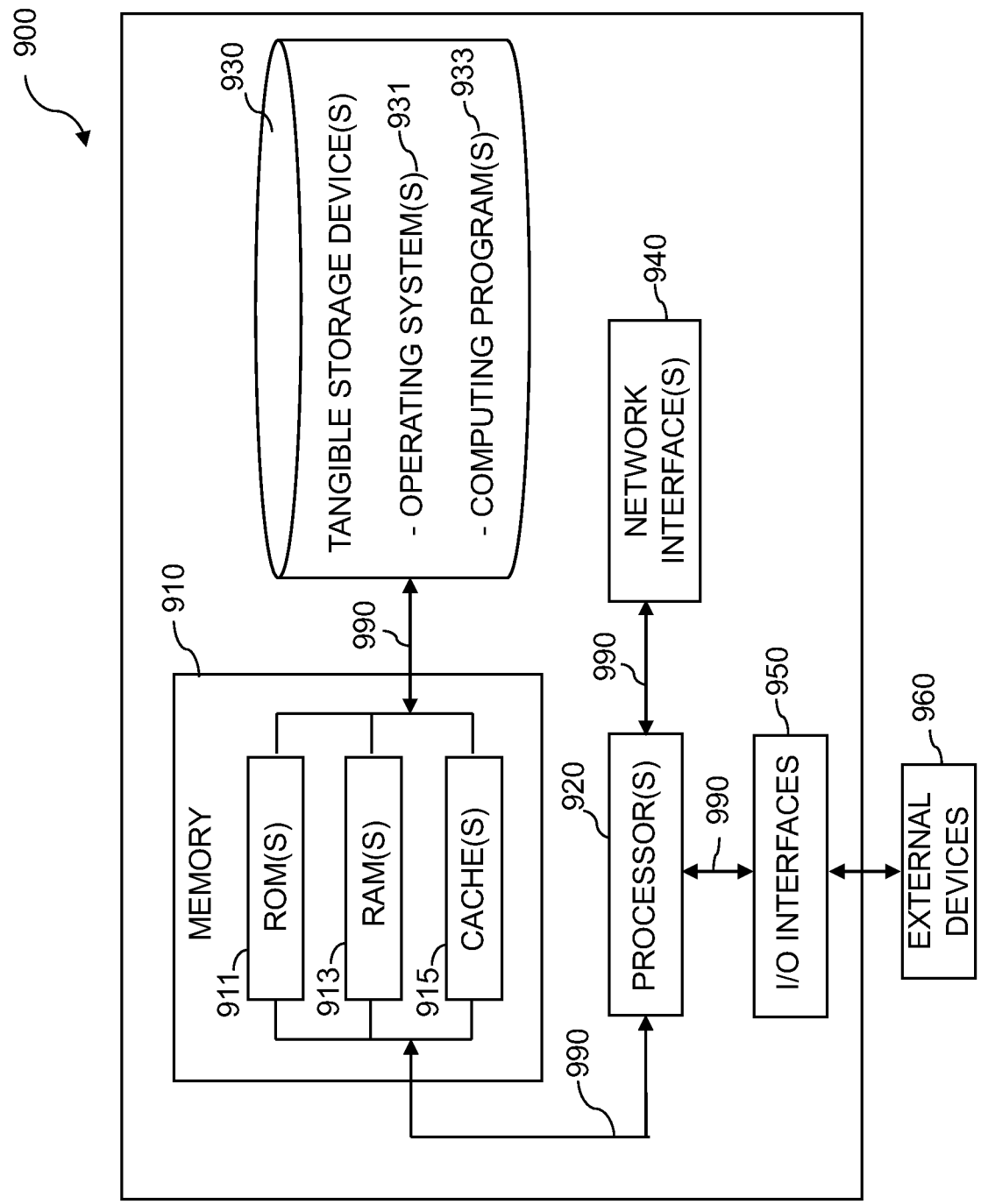
FIG. 9 is a diagram illustrating components of a computing device or server, in accordance with one embodiment of the present invention.

FIG. 9 is a diagram illustrating components of computing device or server 900 hosting a forecasting platform shown in FIG. 2, in accordance with one embodiment of the present invention. It should be appreciated that FIG. 9 provides only an illustration of one implementation and does not imply any limitations with regard to the environment in which different embodiments may be implemented.

Referring to FIG. 9, computing device or server 900 includes processor(s) 920, memory 910, and tangible storage device(s) 930. In FIG. 9, communications among the above-mentioned components of computing device or server 900 are denoted by numeral 990. Memory 910 includes ROM(s) (Read Only Memory) 911, RAM(s) (Random Access Memory) 913, and cache(s) 915. One or more operating systems 931 and one or more computer programs 933 reside on one or more computer readable tangible storage device(s) 930.

Computing device or server 900 further includes I/O interface(s) 950. I/O interface(s) 950 allows for input and output of data with external device(s) 960 that may be connected to computing device or server 900. Computing device or server 900 further includes network interface(s) 940 for communications between computing device or server 900 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
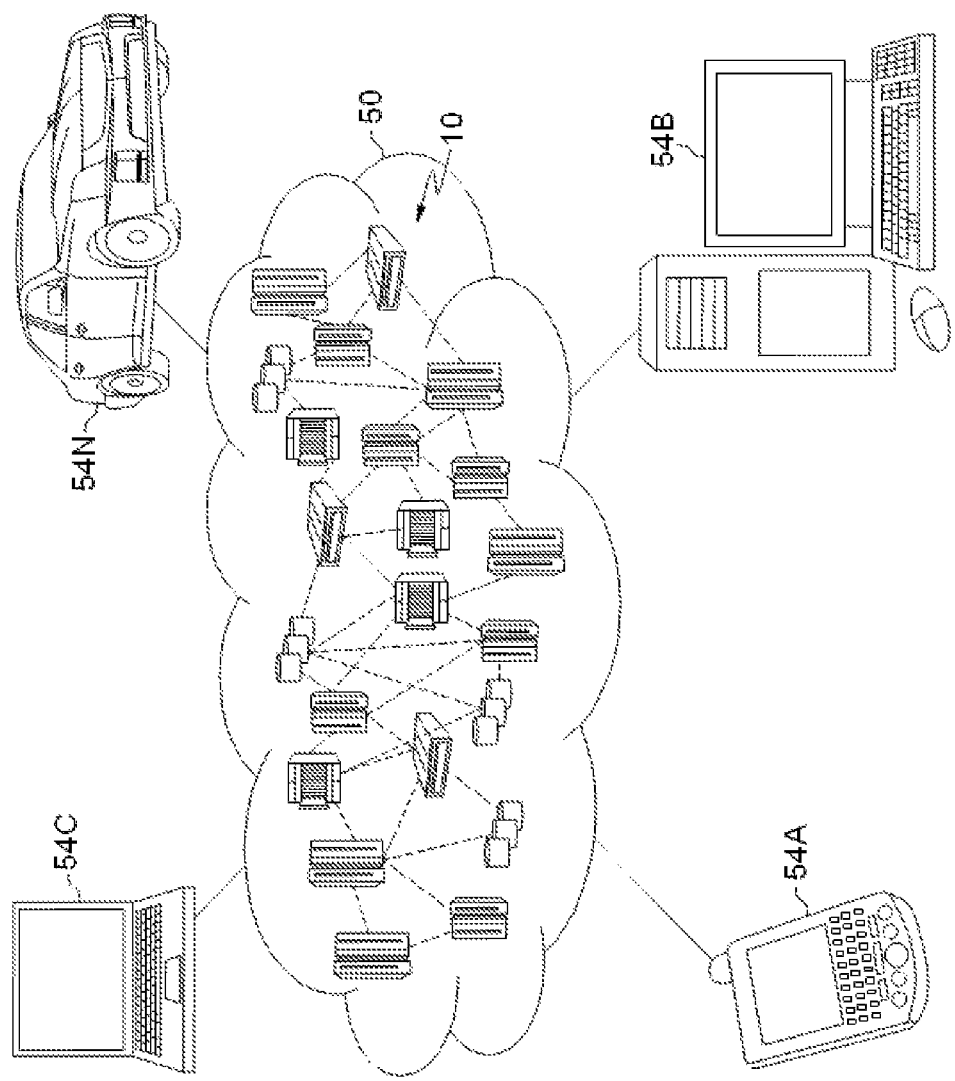
FIG. 10 depicts a cloud computing environment, in accordance with one embodiment of the present invention.

Referring now to FIG. 10, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 11:
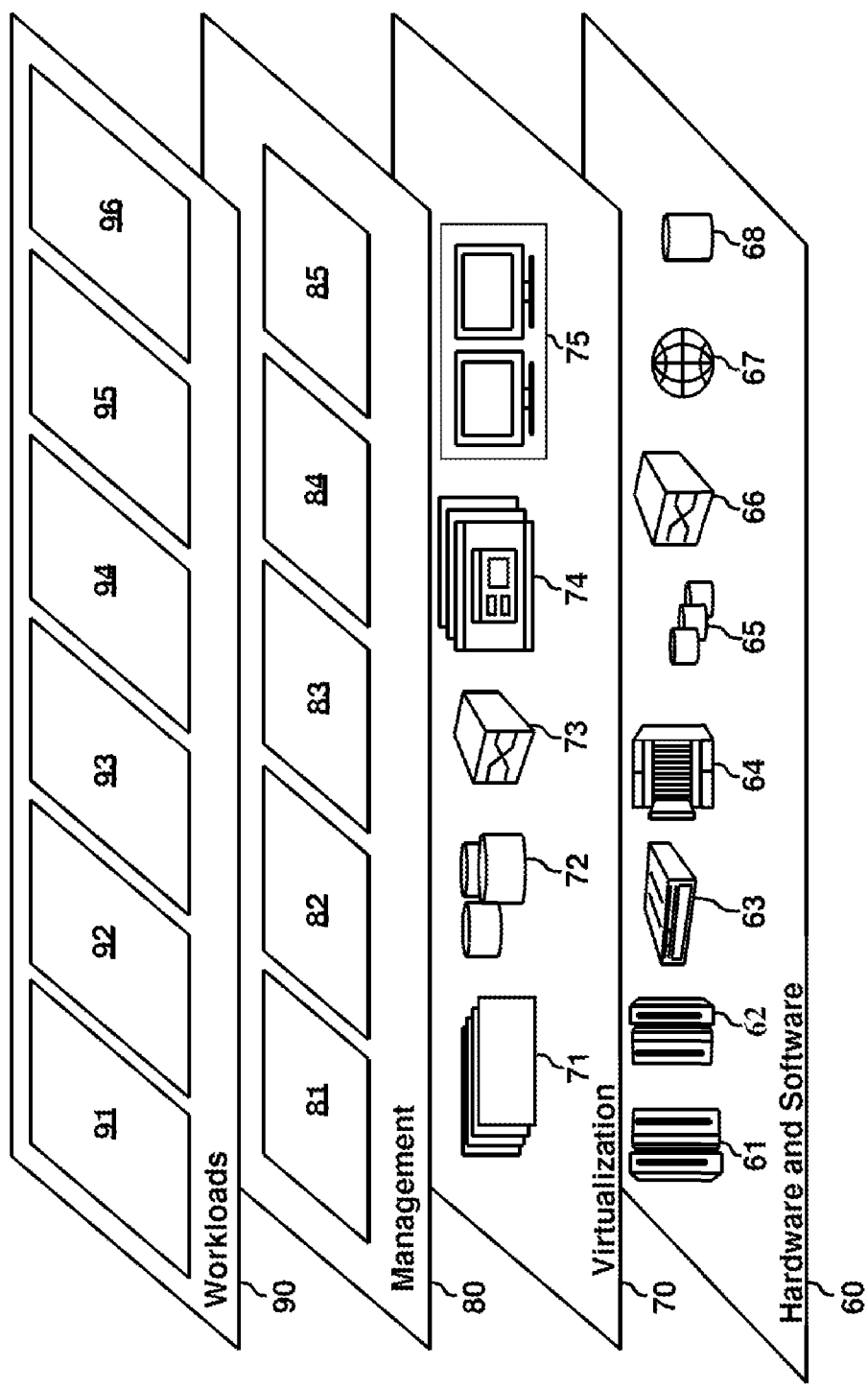
FIG. 11 depicts abstraction model layers in a cloud computing environment, in accordance with one embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of selecting predictions made by forecasting models based on analysis of robustness of the forecasting models.

What is claimed is:

1. A computer-implemented method for selecting predictions made by models with normal and anomalous predictor variable data, the method comprising:

receiving a request for a forecast of a dependent variable in a time domain, the time domain including first respective time periods that have normal labels due to normal predictor variable data and second respective time periods that have anomalous labels due to anomalous predictor variable data;

retrieving accuracy scores and robustness scores of models, the accuracy scores indicating forecasting accuracy in the first respective time periods and the robustness scores indicating forecasting accuracy in the second respective time periods;

selecting dependent variable values predicted by a first model that has highest values of the accuracy scores, for predictions in the first respective time periods; and selecting dependent variable values predicted by a second model that has highest values of the robustness scores, for predictions in the second respective time periods.

2. The computer-implemented method of claim 1, further comprising:

composing the forecast in the time domain, using the dependent variable values predicted by the first model in the first respective time periods and the dependent variable values predicted by the second model in the second respective time periods.

3. The computer-implemented method of claim 1, further comprising:

retrieving the normal labels for the first respective time periods and the anomalous labels for the second respective time periods; and retrieving dependent variable values predicted by models.

4. The computer-implemented method of claim 1, determining the normal labels and the anomalous labels comprises:

retrieving and analyzing predictor variable data;

determining whether the predictor variable data in a time period meets one or more expected characteristics of a predictor variable;

in response to determining that the predictor variable data meets the one or more expected characteristics, attaching a normal label to the time period;

in response to determining that the predictor variable data does not meet the one or more expected characteristics, attaching an anomalous label to the time period;

determining the normal labels for the first respective time periods and the anomalous labels for the second respective time periods; and storing the normal labels and the anomalous labels.

5. The computer-implemented method of claim 4, determining the accuracy scores and the robustness scores comprises:

loading the models;

injecting the predictor variable data to the models;

calculating predicted values of the dependent variable in the first respective time periods and the second respective time periods, using the models; and storing the predicted values.

6. The computer-implemented method of claim 5, further comprising:

retrieving the predicted values of the dependent variable, the normal labels, and the anomalous labels;

retrieving observed values of the dependent variable;

calculating the accuracy scores of the models, using the predicted values and the observed values in the first respective time periods;

calculating the robustness scores of the models, using the predicted values and the observed values in the second respective time periods; and storing the accuracy scores and the robustness scores.

7. A computer program product for selecting predictions made by models with normal and anomalous predictor variable data, the computer program product comprising a computer readable storage medium having program instructions embodied therewith, the program instructions executable by one or more processors, the program instructions executable to:

receive a request for a forecast of a dependent variable in a time domain, the time domain including first respective time periods that have normal labels due to normal predictor variable data and second respective time periods that have anomalous labels due to anomalous predictor variable data;

retrieve accuracy scores and robustness scores of models, the accuracy scores indicating forecasting accuracy in the first respective time periods and the robustness scores indicating forecasting accuracy in the second respective time periods;

select dependent variable values predicted by a first model that has highest values of the accuracy scores, for predictions in the first respective time periods; and select dependent variable values predicted by a second model that has highest values of the robustness scores, for predictions in the second respective time periods.

8. The computer program product of claim 7, further comprising the program instructions executable to:

compose the forecast in the time domain, using the dependent variable values predicted by the first model in the first respective time periods and the dependent variable values predicted by the second model in the second respective time periods.

9. The computer program product of claim 7, further comprising the program instructions executable to:

retrieve the normal labels for the first respective time periods and the anomalous labels for the second respective time periods; and retrieve dependent variable values predicted by models.

10. The computer program product of claim 7, for determining the normal labels and the anomalous labels, further comprising the program instructions executable to:

retrieve and analyzing predictor variable data;

determine whether the predictor variable data in a time period meets one or more expected characteristics of a predictor variable;

in response to determining that the predictor variable data meets the one or more expected characteristics, attach a normal label to the time period;

in response to determining that the predictor variable data does not meet the one or more expected characteristics, attach an anomalous label to the time period;

determine the normal labels for the first respective time periods and the anomalous labels for the second respective time periods; and store the normal labels and the anomalous labels.

11. The computer program product of claim 10, for determining the accuracy scores and the robustness scores, further comprising the program instructions executable to:

load the models;

inject the predictor variable data to the models;

calculate predicted values of the dependent variable in the first respective time periods and the second respective time periods, using the models; and store the predicted values.

12. The computer program product of claim 11, for determining the accuracy scores and the robustness scores, further comprising the program instructions executable to:

retrieve the predicted values of the dependent variable, the normal labels, and the anomalous labels;

retrieve observed values of the dependent variable;

calculate the accuracy scores of the models, using the predicted values and the observed values in the first respective time periods;

calculate the robustness scores of the models, using the predicted values and the observed values in the second respective time periods; and store the accuracy scores and the robustness scores.

13. A computer system for selecting predictions made by models with normal and anomalous predictor variable data, the computer system comprising one or more processors, one or more computer readable tangible storage devices, and program instructions stored on at least one of the one or more computer readable tangible storage devices for execution by at least one of the one or more processors, the program instructions executable to:

receive a request for a forecast of a dependent variable in a time domain, the time domain including first respective time periods that have normal labels due to normal predictor variable data and second respective time periods that have anomalous labels due to anomalous predictor variable data;

retrieve accuracy scores and robustness scores of models, the accuracy scores indicating forecasting accuracy in the first respective time periods and the robustness scores indicating forecasting accuracy in the second respective time periods;

select dependent variable values predicted by a first model that has highest values of the accuracy scores, for predictions in the first respective time periods; and select dependent variable values predicted by a second model that has highest values of the robustness scores, for predictions in the second respective time periods.

14. The computer system of claim 13, further comprising the program instructions executable to:

compose the forecast in the time domain, using the dependent variable values predicted by the first model in the first respective time periods and the dependent variable values predicted by the second model in the second respective time periods.

15. The computer system of claim 13, further comprising the program instructions executable to:

retrieve the normal labels for the first respective time periods and the anomalous labels for the second respective time periods; and retrieve dependent variable values predicted by models.

16. The computer system of claim 13, for determining the normal labels and the anomalous labels, further comprising the program instructions executable to:

retrieve and analyzing predictor variable data;

determine whether the predictor variable data in a time period meets one or more expected characteristics of a predictor variable;

in response to determining that the predictor variable data meets the one or more expected characteristics, attach a normal label to the time period;

in response to determining that the predictor variable data does not meet the one or more expected characteristics, attach an anomalous label to the time period;

determine the normal labels for the first respective time periods and the anomalous labels for the second respective time periods; and store the normal labels and the anomalous labels.

17. The computer system of claim 16, for determining the accuracy scores and the robustness scores, further comprising the program instructions executable to:

load the models;

inject the predictor variable data to the models;

calculate predicted values of the dependent variable in the first respective time periods and the second respective time periods, using the models; and store the predicted values.

18. The computer system of claim 17, for determining the accuracy scores and the robustness scores, further comprising the program instructions executable to:
 further comprising program instructions executable to:
 retrieve the predicted values of the dependent variable, the normal labels, and the anomalous labels;
 retrieve observed values of the dependent variable;
 calculate the accuracy scores of the models, using the predicted values and the observed values in the first respective time periods;
 calculate the robustness scores of the models, using the predicted values and the observed values in the second respective time periods; and
 store the accuracy scores and the robustness scores.

* * * * *